United States Patent

[11] 3,599,795

[72] Inventor Ronald Frederick Worlidge
"High Ridge," 9 Durlston Road, Parkstone, Poole, Dorset, England
[21] Appl. No. 6,759
[22] Filed Jan. 29, 1970
[45] Patented Aug. 17, 1971
[32] Priority Jan. 30, 1969
[33] Great Britain
[31] 5,129/69

[54] APPARATUS FOR SEPARATING SOLIDS FROM LIQUIDS
11 Claims, 4 Drawing Figs.
[52] U.S. Cl. .................................................. 210/413, 210/526
[51] Int. Cl. ..................................................... B01d 35/16
[50] Field of Search ........................................... 210/526, 413, 298, 408

[56] References Cited
UNITED STATES PATENTS
| | | | |
|---|---|---|---|
| 2,865,509 | 12/1958 | Harlan......................... | 210/526 X |
| 3,194,399 | 7/1965 | Harms.......................... | 210/413 X |
| 3,332,556 | 7/1967 | Hirs............................. | 210/413 X |

Primary Examiner—J. L. DeCesare
Attorney—Lawrence E. Laubscher

ABSTRACT: A filtration apparatus comprising a receptacle means into which liquid containing solids may be passed, drainage apertures in a lower region of said receptacle means to permit the passage therethrough under gravity of the liquid and such solids as are capable of filtering through said drainage apertures, and an endless conveyor means operable within said receptacle means and carrying a plurality of spaced apart scraper elements adapted to engage the unfiltered solids in said lower region of said receptacle means and convey such solids to an upper region thereof for discharge from said receptacle means.

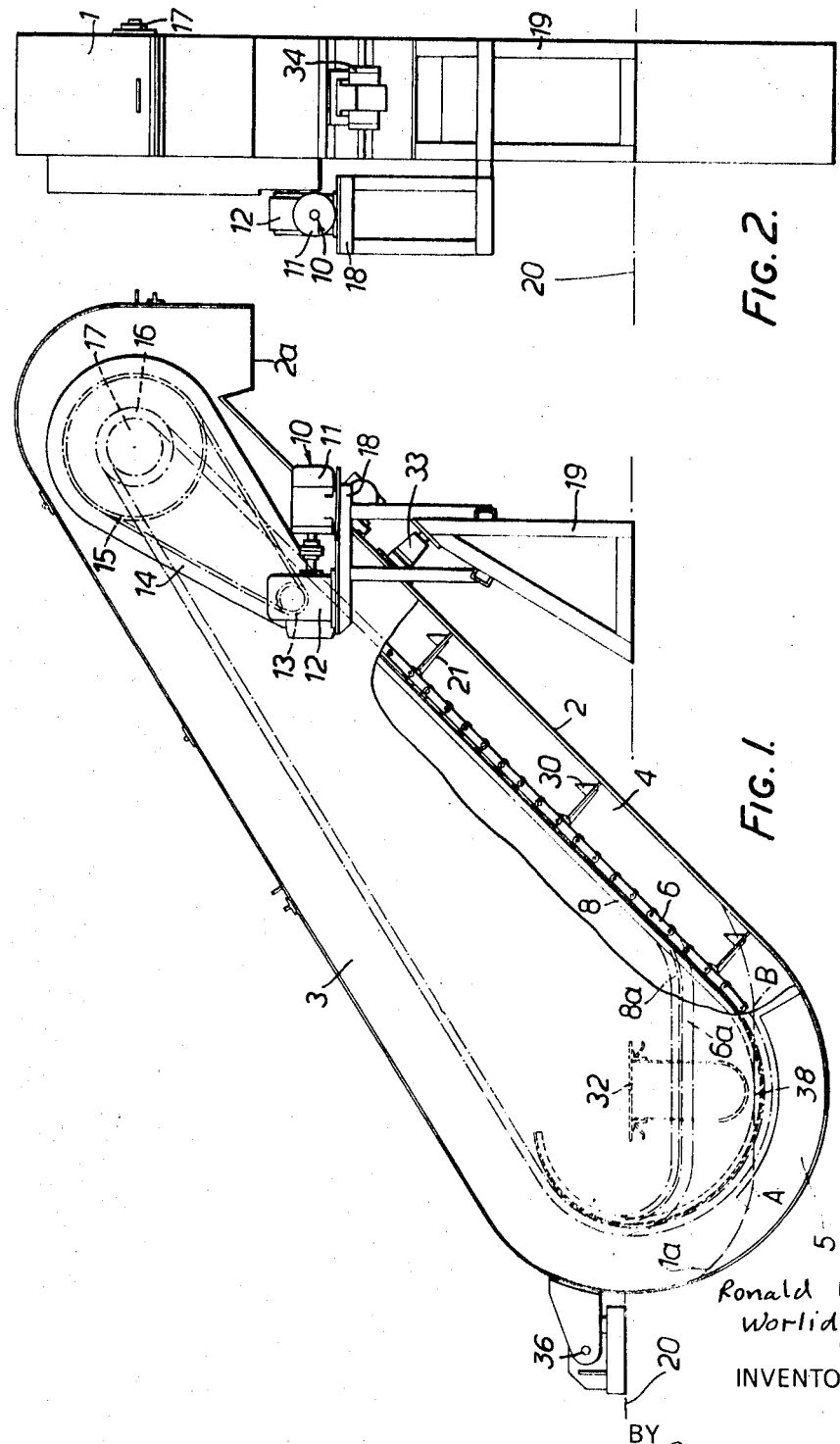

PATENTED AUG 17 1971 3,599,795

Ronald F. Worlidge
INVENTOR

BY Lawrence E. Laubscher
ATTORNEY

APPARATUS FOR SEPARATING SOLIDS FROM LIQUIDS

This invention is concerned with improvements in and relating to filtration apparatus for separating solids from liquids.

According to the invention there is provided a filtration apparatus comprising a receptacle means into which liquid containing solids may be passed, drainage apertures in a lower region of said receptacle means to permit the passage therethrough under gravity of the liquid and such solids as are capable of filtering through said drainage apertures, and an endless conveyor means operable within said receptacle means and carrying a plurality of spaced apart scraper elements adapted to engage the unfiltered solids in said lower region of said receptacle means and convey such solids to an upper region thereof for discharge from said receptacle means.

An embodiment of the invention at present preferred comprises an apparatus for separating solids from liquids and conveying the solids to a collecting point, while at the same time permitting the liquid to pass to a collecting tank, the apparatus being more particularly intended to separate metallic solids, such as swarf, from machine tool coolant, and to remove from the liquid all the coarse material, permitting the fluid and the fine solids to pass to the tank, from which the fluid containing the fine solids may be pumped or passed to a suitable filter.

In order that the invention may be well understood the preferred embodiment thereof, which is given by way of example only, will now be described with reference to the accompanying drawings, in which:

FIG. 1 is a diagrammatic side elevation of a filtration apparatus embodying the invention, with the apparatus partly sectioned to show internal details thereof;

FIG. 2 is an end elevation of the same filtration apparatus;

Figure 3:
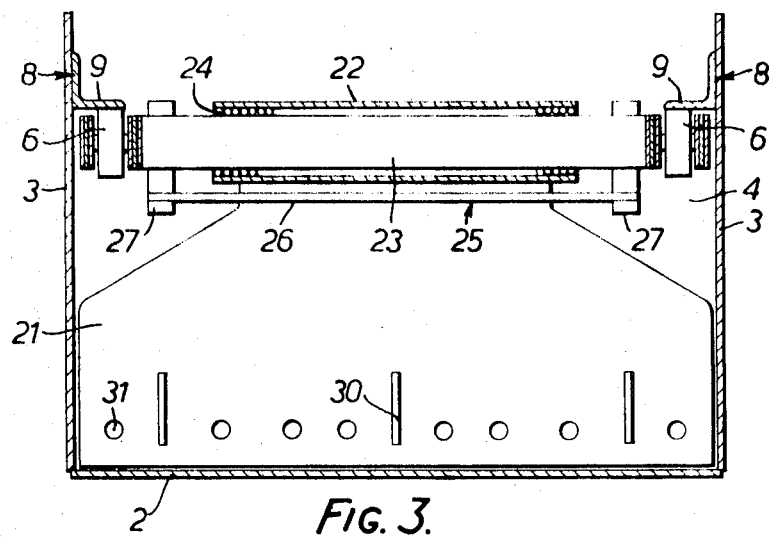
FIG. 3 is a fragmentary cross-sectional elevational view of the same filtration apparatus showing details of the conveyor and scraper plates thereof.
Figure 4:
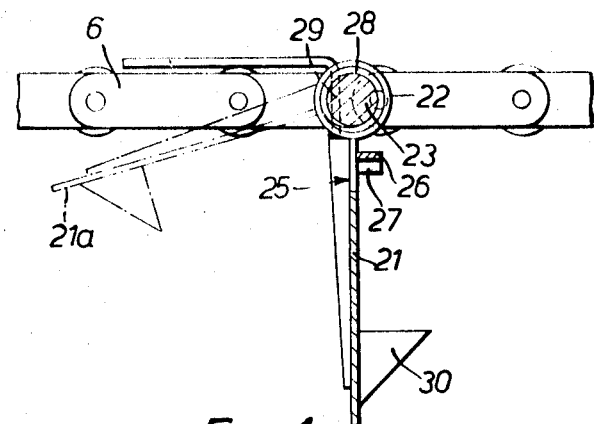
FIG. 4 is a diagrammatic fragmentary side elevation showing details of the fixing of a scraper blade and blade stop to a conveyor chain.

In a machine tool coolant filtration system, there are frequently quantities of swarf of a fairly large size, which it is desirable to remove from the coolant, preferably before the coolant enters the reservoir, since it is much more difficult to remove the swarf after it has entered the reservoir, by virtue of the fact that time must be provided for the swarf to settle to the bottom of the tank, where it may be removed by a drag conveyor, and this time element invariably results in the provision of a fairly large liquid container.

The present apparatus embodying the invention traps the larger swarf before it enters the tank and conveys it to a collecting bin. In the apparatus, there is provided a casing 1 having a semicircular form at its lower end of say 3-foot radius and continuing from the lower part of the semicircular form a ramp 2 proceeding upwards at an angle of approximately 45°. The other end of the circular base section may terminate at a point at the horizontal center line of the circle. Side plates 3 are provided to encase the sides, the side plates of the ramp section forming a trough 4 having a true depth of approximately 1 foot.

The whole of the curved base section and the base of the 45° ramp may be of perforated plate 5, the size of perforations being such that coarse solids will be trapped, while fine solids and liquid may pass through, and the apparatus may conveniently be mounted above the collection tank (not shown), which will receive the fine solids and liquids. The perforated plate 5 would have a width of approximately 18 inches and this would also be the distance between the side plates.

A conveyor is provided consisting of two lengths of heavy roller chain 6, each length running in a track 7 positioned one at each side of the casing 1. The track is so shaped that the chain passes in a path parallel to, and inwardly from, the perforated surface of the casing 1, there being a suitable track for the return of the chain after it has reached the upper end of the 45° ramp 2. Each track 7 comprises an angle member 8 which is secured to the associated casing side plate 3 and the horizontal leg 9 or which serves to guide a roller chain 6.

The two chains 6 are driven simultaneously by a cross-shaft and drive unit 10 located at the upper end of the 45° ramp. The drive unit 10 comprises an electric motor 11 driving, via a speed reducer 12, a sprocket 13 which, in turn, drives, through a chain 14, a chainwheel 15 mounted to the outer side of the casing 1. The chainwheel 15 drives a cross-shaft 17 journaled in the casing 1 and carrying a pair of sprockets 16, each serving to drive one of the roller chains 6 entrained therearound. The drive unit 10 is mounted on a platform 18 supported from a framework 19 mounted at floor level 20.

Spanning between the roller chains 6 are a multiplicity of scraper blades 21, so mounted that they sweep the perforated surface as the chain is caused to move, thus removing collected solids from the bottom of the casing 1, scraping them up the ramp 2 and allowing them to fall at the top end of the ramp into a suitable collecting bin (not shown) placed under the discharge end 2a of the ramp. The scraper blades 21 may further require to be hinged and spring loaded in such a manner that should the scraping edge of the blade be obstructed by say a piece of material jammed in the perforations, the blade may fold back to the attitude 21a to pass the obstruction, the spring loading returning it to its normal position after the obstruction has been passed.

More particularly, each scraper blade 21 has a tubular end 22 rotatably mounted on a cross-shaft 23 extending between and fixed to the roller chains 6 in a manner which will appear. A torsion spring 24 is connected between the blade 21 and the tubular end 22 to spring load the blade into an attitude in which the blade is normal to the chains 6 when extending in a straight line. To prevent spring biasing of the blade past that attitude there is provided a blade stop 25. The blade stop comprises a flat bar 26 extending transversely of the blade and affixed at its ends to a pair of plates 27. Each plate is sandwiched between a flat 28 at the associated end of the shaft 23 and a plate 29 forming part of the associated roller chain 6, the sandwich assembly being suitably bolted together by means not shown.

Furthermore, the edge of the scraper blade 21 adjacent and in contact or proximity to the perforated plate could be of hardened and sharpened material 30 so as to have a shearing action to cut through small pieces of swarf which may be embedded in the perforations, thus removing, by the scraping action, that part of the swarf projecting from the perforations, while permitting the small part cutoff to be washed through the perforations with the flow of liquid. The blade may also be apertured at 31 to permit a back flow of liquid therethrough.

The apparatus may further be provided with a closure plate (not shown) positioned slightly beneath the perforated plate of the ramp section, so that liquid draining through while swarf is being removed up the ramp 2 is guided back into the liquid container.

The filtration apparatus would normally be positioned transversely to the conveyor or trenching (shown diagrammatically at 32) bringing the liquid and swarf from the machines, so that the liquid and swarf are together discharged into the apparatus through either or both of the side plates 3 at a point which may be adjacent to the center of the circular portion of the casing 1. Thus it will be seen that the swarf and liquid will fall by gravity to the bottom of the casing 1, while the return of the chain 6 and associated scraper blades 21 will take place above the point at which the swarf and liquid is entering the casing.

One of the problems encountered in removing swarf from liquid is that the swarf holds within its cavities, when bunched together, a considerable volume of liquid, and it is desirable that as much as possible of this liquid should be removed from the swarf before the swarf is discharged into the collecting bin, and it is a feature of the present apparatus that the whole apparatus may be mounted with a hinged-type mounting 36 adjacent to the outside of the casing 1 and fixed thereto on the side opposite from the ramp 2; thus the whole mechanism may pivot about this point. A further mounting at or adjacent to the top end of the ramp 2 is provided in the form of either a spring mounting or rubber bushes 33 mounted on the framework 19, and a vibrator 34 is rigidly attached to the casing 1 so as to impart a vibratory motion to both the casing, conveyor and swarf as it is scraped up the ramp. This vibrating action will greatly assist in draining the liquid from the swarf prior to its discharge.

The vibrator 34 can consist of any commercial type of apparatus for performing this function, such as the coil-type vibrator, which imparts a 50 cycle frequency directly from the normal electric power supply. It is anticipated that an amplitude of as little as 0.05 inches would greatly assist in drawing the liquid from the swarf.

The described construction would also permit the entire apparatus to be rotated about the lower hinged point 32, should it be necessary at any time for servicing purposes to have access to the underside of the perforated section of the casing 1.

It is anticipated that the conveyor chain would move at a speed of between 4 and 10 feet per minute, according to the type of contamination, and its volume per minute, and it is further anticipated that the apparatus would be made in a variety of sizes, both larger and smaller than that indicated by the dimensions in the foregoing account, according to the volume of liquids and solids that must be accommodated in any given time.

In alternative constructions, the perforated base plates of the casing could be replaced by sheets of apertured screen material such as wedge wire screen and the scraper plates of the conveyor could be replaced by rigidly connected flight bars spanning the two chains. Additionally, where wedge wire screen 38 is used it may be flat between the points A and B as shown in FIG. 1, in which case the casing and the roller chain with its guide track would have the modified outline as also shown in broken line in FIG. 1 and identified with the suffix a.

I claim:

1. A separation apparatus comprising a receptacle means for receiving liquid containing solids, means defining drainage apertures in a lower region of said receptacle means to permit the passage therethrough under gravity of the liquid and such solids as are capable of passing through said drainage apertures, an endless conveyor means operable within said receptacle means and carrying a plurality of spaced apart scraper elements adapted to engage the solids remaining in the lower region of said receptacle means and convey such solids away therefrom for discharge from said receptacle means, means pivotally mounting each of said scraper elements to said conveyor means to enable any one of said scraper elements to pivot, on encountering an obstruction not capable of being conveyed thereby, relative to said conveyor means in such a manner as to reduce the effective scraping length thereof, spring means biasing each of said scraper elements into a normal scraping attitude but permitting said pivotal movement of said scraper elements, and means to impart a vibratory motion to said receptacle means and said conveyor means.

2. A separation apparatus according to claim 1, wherein said receptacle means includes a lower solid wall extending upwardly in an inclined attitude in the manner of a ramp from said lower region of said receptacle means, and said endless conveyor means is constrained to follow a path spaced inwardly from said solid wall such that its scraper elements are capable of urging the unfiltered solids from said lower region of said receptacle means up and along said solid wall to discharge.

3. A separation apparatus according to claim 2, wherein said lower region of said receptacle means includes a base wall having apertures therein to facilitate the passage therethrough of fluid and particles of less than a determined size, said solid wall extending upwardly from a juncture with said base wall and said conveyor means being constrained to follow a path parallel to and spaced radially inwardly from said base wall.

4. A separation apparatus according to claim 3, wherein said lower region of said receptacle means is completed by sidewalls encasing the sides of said base wall, said sidewalls also being provided with drainage apertures.

5. A separation apparatus according to claim 4, wherein at least one of said sidewalls is apertured to permit entry of liquid containing solids into said receptacle means.

6. A separation apparatus according to claim 3, wherein said lower region of said receptacle means is completed by sidewalls encasing the sides of said base wall, and each of said scraper elements extends substantially across the width of a trough defined between said sidewalls, each such scraper element being apertured to permit fluid to pass therethrough as said scraper elements are moved with said conveyor means.

7. A separation apparatus according to claim 6, wherein each of said scraper elements is provided with shearing means projecting from the leading surface thereof in the direction of travel of said conveyor means, said shearing means operating to shear through solid material obstructing said scraper elements.

8. A separation apparatus according to claim 1, wherein said conveyor means carries a stop member for each scraper element and positioned to prevent spring biasing of said scraper element past an attitude normal to said conveyor means when travelling along a straight path of movement.

9. A separation apparatus according to claim 8, wherein each of said stop members comprises a bar extending widthwise of said conveyor means and fixedly connected to said roller chains.

10. A separation apparatus according to claim 8, wherein said conveyor means includes a pair of roller chains spaced apart from each other widthwise of the conveyor means, and a cross-shaft for each of said scraper elements extending between and fixed to said roller chains, each of said scraper elements including a tubular end mounted for pivotal movement around one of said cross-shafts and a torsion spring means operatively connected between said cross-shaft and said tubular end to spring load said scraper element into said normal scraping attitude.

11. A separation apparatus according to claim 1, wherein said receptacle means takes the form of a casing within which is mounted the conveyor means, said casing having a hinged-type mounting about which it is pivotable, said casing further being located by a resilient mounting, said means to impart a vibratory motion including a vibrator for directly vibrating said casing and thereby said conveyor means.